US011466629B2

(12) United States Patent
Lory et al.

(10) Patent No.: US 11,466,629 B2
(45) Date of Patent: Oct. 11, 2022

(54) EXHAUST-GAS FLAP DEVICE

(71) Applicant: Purem GmbH, Neunkirchen (DE)

(72) Inventors: Markus Lory, Stuttgart (DE); Markus Birgler, Wernau (DE); Matthias Grün, Altbach (DE); Andreas Wacker, Plochingen (DE); Annika Zeumer, Wernau (DE); Ralph Schenk, Stuttgart (DE); Miljenko Novosel, Stuttgart (DE)

(73) Assignee: Purem GmbH, Neunkirchen (DE)

(*) Notice: Subject to any disclaimer, the term of this patent is extended or adjusted under 35 U.S.C. 154(b) by 0 days.

(21) Appl. No.: 17/374,463

(22) Filed: Jul. 13, 2021

(65) Prior Publication Data

US 2022/0010739 A1    Jan. 13, 2022

(30) Foreign Application Priority Data

Jul. 13, 2020    (DE) ............... 10 2020 118 356.9

(51) Int. Cl.
| | |
|---|---|
| *F02D 9/10* | (2006.01) |
| *F02M 26/70* | (2016.01) |
| *F02D 9/06* | (2006.01) |
| *F16K 1/22* | (2006.01) |
| *F16K 47/00* | (2006.01) |

(52) U.S. Cl.
CPC ............ *F02D 9/1065* (2013.01); *F02D 9/06* (2013.01); *F02D 9/1005* (2013.01); *F02D 9/106* (2013.01); *F02M 26/70* (2016.02); *F16K 1/221* (2013.01); *F16K 47/012* (2021.08)

(58) Field of Classification Search
CPC ........ F02D 9/1065; F02D 9/06; F02D 9/1005; F02D 9/106; F02M 26/10; F16K 1/221; F16K 47/012
USPC ............................................. 123/323
See application file for complete search history.

(56) References Cited

U.S. PATENT DOCUMENTS

| | | | |
|---|---|---|---|
| 10,508,741 B2 | 12/2019 | Schmitt et al. | |
| 2003/0071524 A1* | 4/2003 | Doi ................... | H02K 5/00 310/64 |
| 2015/0204248 A1* | 7/2015 | Takeda ............... | F16D 3/68 74/411 |
| 2015/0308583 A1* | 10/2015 | Suzuki ................ | F02D 9/02 29/893 |
| 2016/0076597 A1* | 3/2016 | Takeda ............... | F16F 15/126 464/73 |
| 2018/0051611 A1* | 2/2018 | Hwang ............... | F01N 1/18 |
| 2020/0095946 A1 | 3/2020 | Zeumer et al. | |

(Continued)

FOREIGN PATENT DOCUMENTS

| | | |
|---|---|---|
| DE | 10 2007 042 328 A1 | 3/2009 |
| DE | 10 2010 055 382 A1 | 6/2012 |
| DE | 10 2016 114 704 A1 | 1/2018 |

(Continued)

*Primary Examiner* — Mahmoud Gimie
(74) *Attorney, Agent, or Firm* — Walter Ottesen, P.A.

(57) ABSTRACT

An exhaust-gas flap device, especially for the exhaust-gas flow of an internal combustion engine, has a flap pipe and a flap plate that is supported, in the interior of the flap pipe, on a pivot shaft that is rotatable about a pivot axis. The exhaust-gas flap device further includes a pivoting drive for the pivot shaft with a drive element. A coupling unit couples the drive element to the pivot shaft for conjoint rotation about the pivot axis. Vibration-damping material is arranged in the region of the coupling unit.

19 Claims, 3 Drawing Sheets

(56) References Cited

U.S. PATENT DOCUMENTS

2021/0079854 A1    3/2021    Zeumer et al.

FOREIGN PATENT DOCUMENTS

| DE | 10 2017 127 740 A1 | 5/2019 |
| DE | 10 2018 206 791 A1 | 11/2019 |

* cited by examiner

EXHAUST-GAS FLAP DEVICE

CROSS REFERENCE TO RELATED APPLICATION

This application claims priority of German patent application no. 10 2020 118 356.9, filed Jul. 13, 2020, the entire content of which is incorporated herein by reference.

TECHNICAL FIELD

The present invention relates to an exhaust-gas flap device, especially for the exhaust-gas flow of an internal combustion engine. The exhaust-gas flap device includes a flap pipe, a flap plate that is supported, in the interior of the flap pipe, on a pivot shaft that is rotatable about a pivot axis, and a pivoting drive for the pivot shaft with a drive element as well as a coupling unit coupling the drive element to the pivot shaft for conjoint rotation about the pivot axis.

BACKGROUND

An exhaust-gas flap device of the type is known from U.S. Pat. No. 10,508,741. In the case of this exhaust-gas flap device, the pivot shaft, in its two axial end regions, is supported in respective bearing bushings arranged on the flap pipe, or pivot bearings arranged therein, so as to be pivotable about the pivot axis. During a pivoting of the pivot shaft caused by the pivoting drive, friction occurs in the region of the pivot bearings, which are generally in the form of plain bearings. This friction can lead to an excitation of vibration of the pivot shaft and thus in particular also of the coupling unit that couples the pivot shaft to the pivoting drive. Such an excitation of vibration in the region of the pivot shaft or of the coupling unit can lead to the emission of noise that is perceptible in a vehicle.

SUMMARY

An object of the present invention is to provide an exhaust-gas flap device in the case of which the emission of sound generated by vibrations in the region of the exhaust-gas flap device is suppressed.

An object of the invention is achieved by an exhaust-gas flap device, especially for the exhaust-gas flow of an internal combustion engine, which device has a flap pipe, a flap plate that is supported, in the interior of the flap pipe, on a pivot shaft that is rotatable about a pivot axis, and a pivoting drive for the pivot shaft with a drive element. The exhaust-gas flap device further includes a coupling unit which couples the drive element to the pivot shaft for conjoint rotation about the pivot axis.

The exhaust-gas flap device is configured to have vibration-damping material arranged in the region of the coupling unit.

Through the provision of vibration-damping material in the region of the coupling unit, it is ensured that vibrations generated in the region of the exhaust-gas flap device substantially cannot lead to an excitation of the coupling unit that leads to an emission of sound, or that sound emitted by the coupling unit is dampened directly in the region of the coupling unit.

For pronounced damping behavior, it is proposed that the vibration-damping material comprises porous material. Here, the use of open-pore material for the vibration-damping material has proven especially suitable.

Since, in general, very high temperatures prevail in the region of such an exhaust-gas flap device, it is proposed that the vibration-damping material includes wire material. In this way, a temperature-resistant construction is ensured.

Owing to a structure for the wire material that can be set in order to obtain a defined damping characteristic, it is particularly advantageous if the wire material comprises weft-knitted wire, warp-knitted wire, braided wire or woven wire. Such material can be provided with a defined structure, in particular a defined density of the wire material, on the one hand through the selection of the wire raw material and on the other hand through the setting of the production parameters. Alternatively, for the wire material, use may be made of irregular wire material, in which there is a substantially unordered profile of the wire sections that form the material. Such irregular wire material may be provided for example in the form of so-called wire wool.

For a stable coupling of the pivot shaft to the drive element, it is proposed that the coupling unit includes a coupling element with a first coupling region, which is coupled or provided for coupling to the drive element, with a second coupling region, which is coupled or provided for coupling to the pivot shaft, and with at least one connecting region, which connects the first coupling region to the second coupling region. Such a coupling element may for example be constructed with sheet-metal material, and may be bent into a substantially ring-shaped or U-shaped form. The coupling element constructed with a for example ring-shaped or U-shaped form may also be constructed from multiple parts that interact with one another.

For an efficient action of the sound-deadening material, it is proposed that the two coupling regions and the at least one connecting region surround a coupling element interior space, and that at least a part of the vibration-damping material is arranged in the coupling element interior space.

In order to be able to realize thermal shielding between the pivot shaft, which is generally exposed to the exhaust-gas stream and thus intensely heated, and the drive element, a first heat shield element may be provided in the coupling element interior space. Here, the vibration-damping material arranged in the coupling element interior space may be arranged so as to surround the first heat shield element such that at least a part of the vibration-damping material arranged in the coupling element interior space is positioned between the first heat shield element and the first coupling region and/or at least a part of the vibration-damping material arranged in the coupling element interior space is arranged between the first heat shield element and the second coupling region.

In order to further support the thermal shielding between the system region that is intensely heated during operation, that is, in particular the pivot shaft and the flap pipe, and the pivoting drive, a second heat shield element may be provided on a side of the second coupling region facing toward the pivot shaft or the flap pipe. Here, furthermore, at least a part of the vibration-damping material may be provided in the region of the second heat shield element.

The second heat shield element is preferably of pot-like form with a base wall, which faces toward the second coupling region, and with a peripheral wall, which adjoins the base wall, the base wall and the peripheral wall surrounding a heat shield element interior space which is open in a direction away from the coupling element.

This pot-like form of the heat shield element can be utilized for the positioning of sound-deadening material in that at least a part of the vibration-damping material provided in the region of the second heat shield element is arranged at least partially in the heat shield element interior space.

Alternatively or in addition, at least a part of the vibration-damping material provided in the region of the second heat shield element may be arranged so as to surround the peripheral wall at an outer side averted from the heat shield element interior space.

In order to couple the vibration-damping material to the coupling unit such that an impairment of the damping characteristic as a result of the coupling is avoided, it is proposed that the vibration-damping material is held on the coupling unit by positive locking.

For this purpose, on the coupling unit, there may for example be provided at least one positive-locking holding region which engages over the vibration-damping material.

Alternatively or in addition to the attachment of the sound-deadening material to the coupling unit by positive locking, a firm connection may be achieved by virtue of the vibration-damping material being held on the coupling unit by material cohesion. This material cohesion may be implemented for example by welding, brazing and/or adhesive bonding.

BRIEF DESCRIPTION OF THE DRAWINGS

The invention will now be described with reference to the drawings wherein.

DESCRIPTION OF THE PREFERRED EMBODIMENTS

Figure 1:
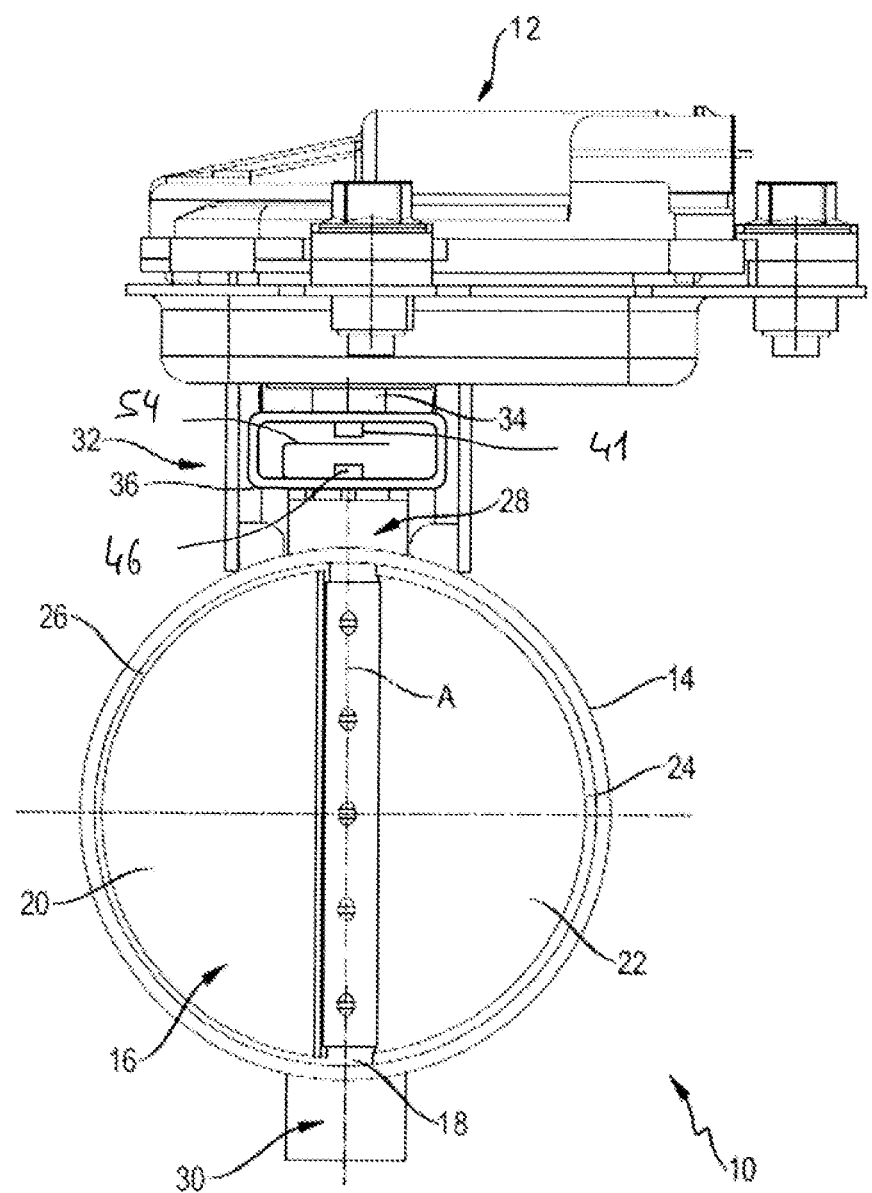
FIG. 1 shows an exhaust-gas flap device for the exhaust-gas flow of an internal combustion engine.

FIG. 1 shows, in a side view, an exhaust-gas flap device which is denoted generally by 10 and which can be used for example in an exhaust-gas system of an internal combustion engine and which has a flap drive 12. The exhaust-gas flap device 10 includes a flap pipe 14 in which a flap plate denoted generally by 16 is supported, pivotably about a pivot axis A, on a pivot shaft 18. The flap plate 16 includes two flap wings 20, 22 which, in the case of a flap plate 16 positioned in a shut-off position, lie against wing stops 24, 26 provided on the inner circumference of the flap pipe 14. The pivot shaft 18 is, on its two axial end regions 28, 30, supported by respective bearing arrangements so as to be rotatable or pivotable relative to the flap pipe 14 about the pivot axis A. In its first axial end region 28, the pivot shaft 18 is coupled by a coupling unit 32, described below, to a drive element 34 of the flap drive 12, for example a drive shaft, for conjoint rotation. In this region, the pivot shaft 18 may be coupled to the coupling unit 32 directly or via a component that is fixed to the pivot shaft for conjoint rotation therewith.

Figure 2:
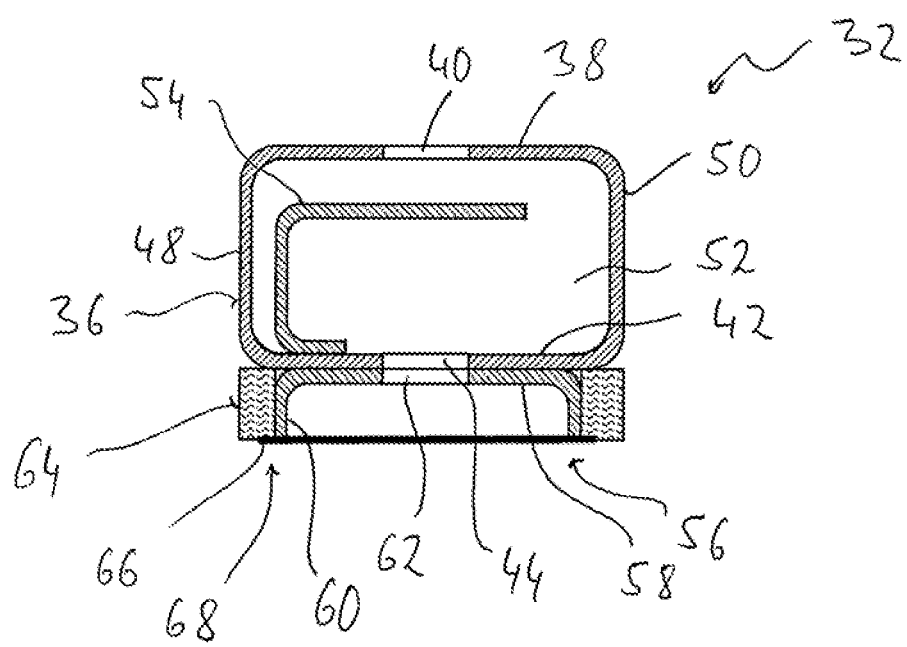
FIG. 2 shows a coupling unit for the exhaust-gas flap device of FIG. 1.

The coupling unit 32, which is shown only schematically in FIG. 1, can be seen in more detail in FIG. 2. The coupling unit 32 includes a coupling element which is denoted generally by 36 and which is preferably constructed with sheet-metal material. The coupling element 36 is illustrated in FIG. 2 as being of an annular form, and includes a substantially plate-like or planar first coupling region 38, wherein the coupling element 36 can be coupled to the drive shaft, which acts as drive element 34, of the flap drive 12 for conjoint rotation. For this purpose, the coupling element 36 has, in its first coupling region 38, a positive-locking engagement opening 40, into which a positive-locking engagement projection 41 provided on the drive element 34 can be positioned so as to engage in order to couple the drive element 34 to the coupling element 36 for conjoint rotation about the pivot axis A.

Correspondingly, the coupling element 32 is constructed with a plate-like or substantially planar second coupling region 42, in which there is formed a positive-locking coupling opening 44 for receiving a positive-locking coupling projection 46, which is of complementary shape, of the pivot shaft 18 in order to couple the coupling element 36 to the pivot shaft 18 for conjoint rotation about the pivot axis A.

It is pointed out that the coupling element 36, which is constructed for example from bent sheet-metal material, may be bent from a single sheet-metal strip, the mutually opposite end regions of which can be connected to one another for example in materially cohesive fashion in order to realize a closed annular structure, or the two end regions of which can be positioned so as to overlap such that, for example, one of the two coupling regions 38, 42 is formed by two mutually overlapping end regions of the sheet-metal material provided for the construction of the coupling element 36.

In the embodiment shown, the two coupling regions 38, 42 are connected to one another by two connecting regions 48, 50 in order to obtain the annular structure. In an alternative embodiment, such a coupling element 36 could be provided with a U-shaped structure, in the case of which the two coupling regions 38, 42 are then connected to one another only by one such connecting region 48 or 50.

In order to realize thermal shielding between the shafts which are situated with their axial end regions facing one another, that is, between the drive shaft, which acts as drive element 34, of the flap drive 12 and the pivot shaft 18, a first heat shield element 54 is provided in a coupling element interior space 52 which is formed in the coupling element 36 and which is surrounded by the two coupling regions 38, 42 and the two connecting regions 48, 50. The first heat shield element 54 extends between the mutually facing end regions of the abovementioned shafts and thus prevents heat transfer from the pivot shaft 18, which is intensely heated during operation, to the drive element 34 by thermal radiation.

In order to achieve further improved thermal shielding, a second heat shield element 56, for example likewise constructed from sheet-metal material, may be provided as an alternative or in addition to the first heat shield element 54. The second heat shield element 56 is formed with a substantially pot-like structure and comprises a base wall 58, which is arranged on the second coupling region 42 at its side facing toward the pivot shaft 18 or the flap pipe 14 and which is connected in materially cohesive fashion, for example by welding, to the coupling element 36 and/or which is held axially fixedly between the coupling element 36 and the pivot shaft 18, and a peripheral wall 60 which adjoins the base wall in the outer peripheral region. The second heat shield element 56 is preferably also constructed with sheet-metal material and has a passage opening 62 assigned to the positive-locking engagement opening 44 in the second coupling region 42, such that the pivot shaft 18 can be inserted with its end region, which is to be coupled to the coupling element 36, into the positive-locking engagement opening 44.

The coupling element 36 may be arranged between the two shafts that are to be coupled to one another, in such a way that the coupling element is held under preload between the shafts and thus preloads the mutually facing end regions of the shafts in a direction away from one another. In this way, defined axial positioning for the pivot shaft 18 can be achieved, taking into consideration a generally inevitably present bearing play of the bearing arrangement, which bears the pivot shaft 18 axially, for example in the region of the axial end region 28 of the pivot shaft 18.

Vibration-damping material, denoted in FIG. 2 generally by 64, is provided in the region of the coupling unit 32. The vibration-damping material 64 is constructed preferably with wire material, for example weft-knitted wire, and in the illustrated embodiment has an annular structure which surrounds the peripheral wall 60 of the second heat shield element 56. For the vibration-damping material 64 to be held in a defined manner on the coupling unit 32, the peripheral wall 60 of the second heat shield element 56 may, at least in peripheral regions thereof, be bent radially outward in order, with an edge region 66 which engages radially over the vibration-damping material 64, to provide a positive-locking holding region denoted generally by 68. The vibration-damping material 64 is thus held so as to lie in a defined manner against the outer peripheral surface of the peripheral wall 60 in a radial direction with respect to the pivot axis A, and is held in a defined manner between the coupling element 36 and the positive-locking holding region 68 in an axial direction of the pivot axis A. Alternatively or in addition to the generation of the positive locking by means of the positive-locking holding region 68, the vibration-damping material 64 may be held fixedly on the coupling unit 32 by material cohesion, for example welding, brazing and/or adhesive bonding.

Because of the vibration-damping material 64 provided in the region of the coupling unit 32, it is ensured that vibrations that are generated in the region of the exhaust-gas flap 10, or transmitted thereto, during operation cannot lead to such an excitation of vibration of the coupling unit 32, in particular of the coupling element 36, that sound that is perceptible in a vehicle is emitted. Furthermore, the vibration-damping material 64 can absorb excitations of vibration which occur in the region of the coupling unit 32 and which possibly lead to an emission of sound, such that the vibration-damping material 64 firstly contributes to fundamentally preventing the occurrence of an excitation of vibration of the coupling unit 32 to the greatest possible extent, and secondly contributes to absorbing sound emitted by the coupling unit 32 if such excitations of vibration occur.

The vibration-damping material, which in the embodiment illustrated in FIG. 2 is configured in a ring-shaped form, is preferably produced in a production process that leads to a defined porous, open-pore structure, for example a weft-knitting process, a warp-knitting process, a braiding process or a weaving process. In the case of such a production procedure, the vibration-damping material 64 can be provided with the required annular closed form with a substantially hose-like structure, and subsequently compressed in order to obtain the desired dimensions and the desired density of the wire material present in the vibration-damping material or the desired porosity.

Figure 3:
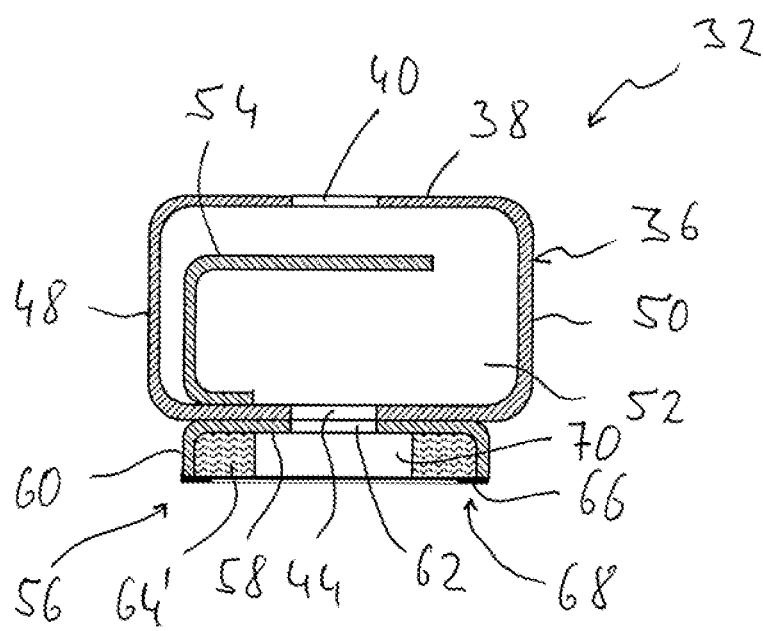
FIG. 3 is a schematic, corresponding to FIG. 2, of an alternative configuration of a coupling unit; and, FIG. 4 is a schematic, corresponding to FIG. 2, of an alternative configuration of the coupling unit.

An alternative embodiment is illustrated in FIG. 3. In this embodiment, the vibration-damping material 64' is arranged in a heat shield element interior space 70 which is surrounded by the base wall 58 and by the peripheral wall 60 of the second heat shield element 56. For the pivot shaft 18 to engage through, it is also the case in this embodiment that the vibration-damping material 64' is formed with a ring-like structure. In this embodiment, too, a defined holding action on the second heat shield element 56 by positive locking is achieved in that the peripheral wall 60 is, over at least a part of its periphery, bent so as to provide an edge region 66, which in this case engages radially inward and provides the positive-locking holding region 68. The vibration-damping material 64' is held in an axial direction between the edge region 66 and the base wall 58. Since the vibration-damping material 64' bears against the inner surface of the peripheral wall 60, it is also held in a defined manner in a radial direction.

It is pointed out that the embodiments illustrated in FIGS. 2 and 3, with vibration-damping material 64 on the outer periphery of the second heat shield element 56 and vibration-damping material 64' on the inner periphery of the second heat shield element 56, may self-evidently be combined with one another.

Figure 4:
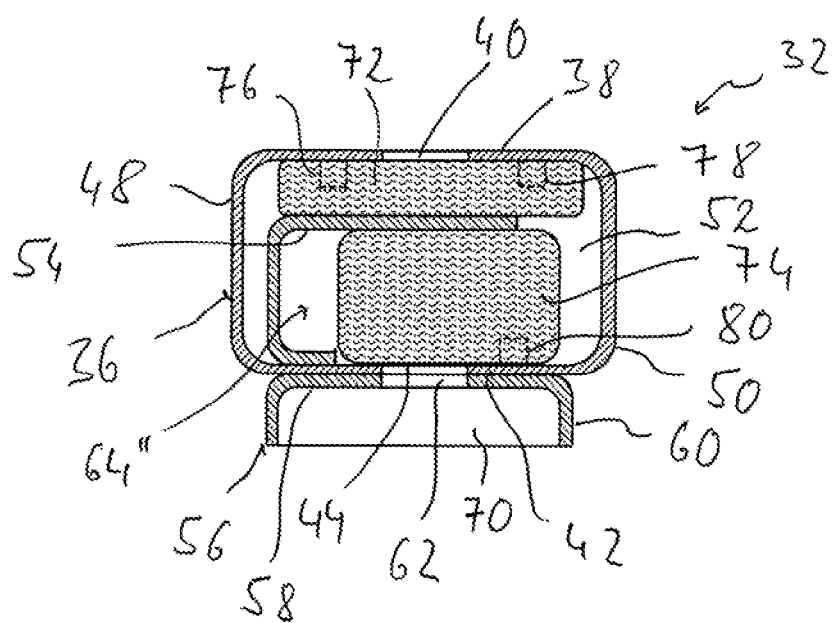

A further alternative embodiment is illustrated in FIG. 4. In this embodiment, the vibration-damping material 64" is arranged in the coupling element interior space 52. In the embodiment illustrated, two vibration-damping bodies 72, 74 of the vibration-damping material 64" are provided. The vibration-damping body 72 is situated between the first coupling region 38 and the first heat shield element 54. The vibration-damping body 74 is situated between the first heat shield element 54 and the second coupling region 42, wherein a limb, which is fixed to the second coupling region 42, of the first heat shield element 54 may also be positioned at least regionally between the vibration-damping body 74 and the second coupling region 42.

It can be seen that the two vibration-damping bodies 72, 74 can be positioned so as to overlap the positive-locking engagement openings 40 and 44 respectively in the two coupling regions 38, 42. When the two positive-locking coupling projections 41, 46 are pushed into the positive-locking coupling openings 40, 44, the vibration-damping material 64" can be locally compressed. In order to avoid such compression, the vibration-damping material 64" may be provided such that it has recesses assigned to the positive-locking engagement openings 40, 44 in order to be able to receive the positive-locking coupling projections 41, 46 therein. For example, the two vibration-damping bodies 72, 74 may be provided with a ring-like structure.

As an alternative to the configuration of the vibration-damping material 64" with two or more vibration-damping bodies 72, 74, it would also be possible, in the coupling element interior space 52, for the vibration-damping material 64" to be constructed with a single vibration-damping body which engages around the first heat shield element 54 and which, in this way, is positioned such that the vibration-damping material 64" is situated between the first heat shield element 54 and the first coupling region 38 and between the first heat shield element 54 and the second coupling region 42.

In order, in the embodiment illustrated in FIG. 4, to be able to hold the vibration-damping material 64" on the coupling unit 32 in a defined manner, it is for example possible for holding tabs 76, 78, 80 to be provided on the two coupling regions 38, 42, which holding tabs engage over the vibration-damping material 64" at the lateral edge regions, which lie transversely with respect to the pivot axis A, of the coupling element 36 in order to thus provide a positive-locking holding region 68. It is thus also the case in this embodiment that an impairment of the porous structure of the vibration-damping material 64", for example as a result of welding the vibration-damping material 64" to the coupling element 36, is avoided.

It is pointed out that the embodiment illustrated in FIG. 4 may also be combined with the embodiment of FIG. 2 and/or the embodiment of FIG. 3.

It is understood that the foregoing description is that of the preferred embodiments of the invention and that various changes and modifications may be made thereto without departing from the spirit and scope of the invention as defined in the appended claims.

What is claimed is:

1. An exhaust-gas flap device, including for the exhaust-gas flow of a combustion engine, the exhaust-gas flap device comprising:
   a flap pipe defining an interior;
   a pivot shaft rotatably mounted so as to pivot about a pivot axis (A);
   a flap plate supported in said interior on said pivot shaft;
   a pivot drive for said pivot shaft and said pivot drive including a drive element;
   a coupling unit coupling said drive element to said pivot shaft so as to permit conjoint rotation about said pivot axis (A);
   vibration-damping material mounted to said coupling unit so as to permit conjoint rotation thereof with said coupling unit about said pivot axis (A);
   said coupling unit including:
   a coupling element defining a first coupling region coupled to or provided for coupling to said drive element;
   said coupling element further defining a second coupling region coupled to or provided for coupling to said pivot shaft;
   said coupling element further defining at least one connecting region connecting said first coupling region to said second coupling region;
   said first coupling region, said second coupling region and said at least one connecting region conjointly surrounding a coupling element interior space; and,
   at least a portion of said vibration-damping material being arranged in said coupling element interior space so as to permit conjoint rotation thereof with said coupling unit about said pivot axis (A).

2. The exhaust-gas flap device of claim 1, wherein said vibration-damping material comprises porous material.

3. The exhaust-gas flap device of claim 2, wherein said vibration-damping material comprises open-pore material.

4. The exhaust-gas flap device of claim 1, wherein said vibration-damping material comprises wire material.

5. The exhaust-gas flap device of claim 4, wherein said wire material includes weft-knitted material, warp-knitted material, braided wire, woven wire or tangled wire material.

6. The exhaust-gas flap device of claim 1, further comprising:
   a first heat shield arranged in said coupling element interior space; and,
   said vibration-damping material arranged in said coupling interior space being disposed to so surround said first heat shield that at least a portion of said vibration-damping material disposed in said coupling element interior space is positioned between said first heat shield and said first coupling region and/or at least a portion of said vibration-damping material arranged in said coupling element interior space is disposed between said first heat shield and said second coupling region.

7. The exhaust-gas flap device of claim 1, further comprising:
   said second coupling region having a side facing toward said pivot shaft;
   a second heat shield disposed at said side of said second coupling region facing toward said pivot shaft; and,
   at least a portion of said vibration-damping material being disposed in the region of said second heat shield.

8. The exhaust-gas flap device of claim 7, further comprising:
   said second heat shield being configured to have a pot-shaped form defining a base wall facing toward said second coupling region;
   said pot-shaped form further defining a peripheral wall transitioning into said base wall; and,
   said base wall and said peripheral wall conjointly surrounding a heat shield interior space opening in a direction away from said coupling element.

9. The exhaust-gas flap device of claim 8, wherein at least a portion of said vibration-damping material disposed in the region of said second heat shield is arranged at least in part in said heat shield interior space.

10. The exhaust-gas flap device of claim 8, wherein at least a portion of said vibration-damping material disposed in the region of said second heat shield is arranged so as to surround said peripheral wall on an outer side thereof facing away from said heat shield interior space.

11. The exhaust-gas flap device of claim 1, wherein said vibration-damping material is held in place by a positive-locking hold on said coupling unit.

12. The exhaust-gas flap device of claim 11, wherein said coupling unit has at least one positive-locking holding region engaging over said vibration-damping material.

13. The exhaust-gas flap device of claim 1, wherein said vibration-damping material is held on said coupling unit by material cohesion.

14. An exhaust-gas flap device, including for the exhaust-gas flow of a combustion engine, the exhaust-gas flap device comprising:
   a flap pipe defining an interior;
   a pivot shaft rotatably mounted so as to pivot about a pivot axis (A);
   a flap plate supported in said interior on said pivot shaft;
   a pivot drive for said pivot shaft and said pivot drive including a drive element;
   a coupling unit coupling said drive element to said pivot shaft so as to permit conjoint rotation about said pivot axis (A);
   a heat shield mounted on said coupling unit between said drive element and said pivot shaft so as to permit conjoint rotation thereof with said coupling unit about said pivot axis (A); and,
   vibration-damping material mounted to said coupling unit in the region of said heat shield so as to permit conjoint rotation thereof with said coupling unit about said pivot axis (A).

15. An exhaust-gas flap device, including for the exhaust-gas flow of a combustion engine, the exhaust-gas flap device comprising:
   a flap pipe defining an interior;
   a pivot shaft rotatably mounted so as to pivot about a pivot axis (A);
   a flap plate supported in said interior on said pivot shaft;
   a pivot drive for said pivot shaft and said pivot drive including a drive element;

a coupling unit coupling said drive element to said pivot shaft so as to permit conjoint rotation about said pivot axis (A); and, vibration-damping material disposed in the region of said coupling unit so as to permit conjoint rotation thereof with said coupling unit about said pivot axis (A);

said coupling unit including:

a coupling element defining a first coupling region coupled to or provided for coupling to said drive element;

said coupling element further defining a second coupling region coupled to or provided for coupling to said pivot shaft; and, said coupling element further defining at least one connecting region connecting said first coupling region to said second coupling region, said second coupling region having a side facing toward said pivot shaft;

a second heat shield being mounted to said second coupling region at said side thereof facing toward said pivot shaft so as to permit conjoint rotation thereof with said coupling unit about said pivot axis (A); and, at least a portion of said vibration-damping material mounted to said coupling element being disposed in the region of said second heat shield so as to permit conjoint rotation thereof with said coupling unit about said pivot axis (A).

16. The exhaust-gas flap device of claim 15, wherein said vibration-damping material comprises porous material.

17. The exhaust-gas flap device of claim 16, wherein said vibration-damping material comprises open-pore material.

18. The exhaust-gas flap device of claim 15, wherein said vibration-damping material comprises wire material.

19. The exhaust-gas flap device of claim 18, wherein said wire material includes weft-knitted material, warp-knitted material, braided wire, woven wire or tangled wire material.

* * * * *